United States Patent [19]
Davis et al.

[11] 3,923,103
[45] Dec. 2, 1975

[54] CULTIVATOR SKIMMER DEVICE

[76] Inventors: Jimmie L. Davis, Rte. 2 Box 126; Alfred C. Harris, Jr., 408 C 15th St., both of Abernathy, Tex. 79311

[22] Filed: Dec. 2, 1974

[21] Appl. No.: 528,871

[52] U.S. Cl. ............... 172/201; 172/382; 172/72; 171/10; 172/81; 172/512; 172/730; 172/722; 172/767; 172/701

[51] Int. Cl.² ............... A01B 49/02; A01B 39/26; A01B 35/26

[58] Field of Search ......... 172/63, 73, 81, 767, 180, 172/201, 382, 10, 512, 730, 770, 361, 381, 720

[56] References Cited
UNITED STATES PATENTS

| | | | |
|---|---|---|---|
| 317,277 | 5/1885 | Atterbury | 172/512 |
| 673,135 | 4/1901 | Denny | 172/720 X |
| 1,633,232 | 6/1927 | Sievers | 172/720 |
| 2,006,672 | 7/1935 | Combs | 172/381 X |
| 3,155,169 | 11/1964 | Mattson et al. | 172/512 |
| 3,289,772 | 12/1966 | Blackwood | 172/730 |

*Primary Examiner*—George J. Marlo
*Attorney, Agent, or Firm*—Fishburn, Gold & Litman

[57] ABSTRACT

A cultivator skimmer adapted for movement longitudinally in relation to a row of plants to be cultivated and generally in straddling relationship therewith to shield them from earth thrown rearward during a cultivation process. Viewed from above, the skimmer has a shield with a front portion in the shape of a triangle, the vertex of which is at the front tip of the shield, and the sidewardly extending halves of which angle downwardly, thus imparting to the triangular front portion a transversal cross-section in the shape of an inverted "V." The shield also includes a rear portion which extends rearwardly from the front portion, is closed at the top, and has sides which extend downwardly and are spaced apart at the lower edges to form a channel which covers row plants or seeds during cultivation, "scratching," or "skimming" operations.

10 Claims, 7 Drawing Figures

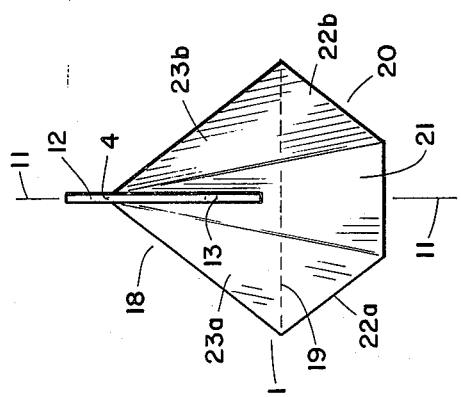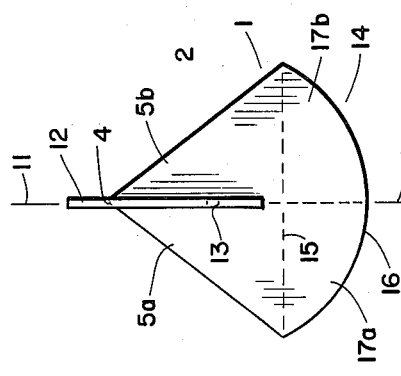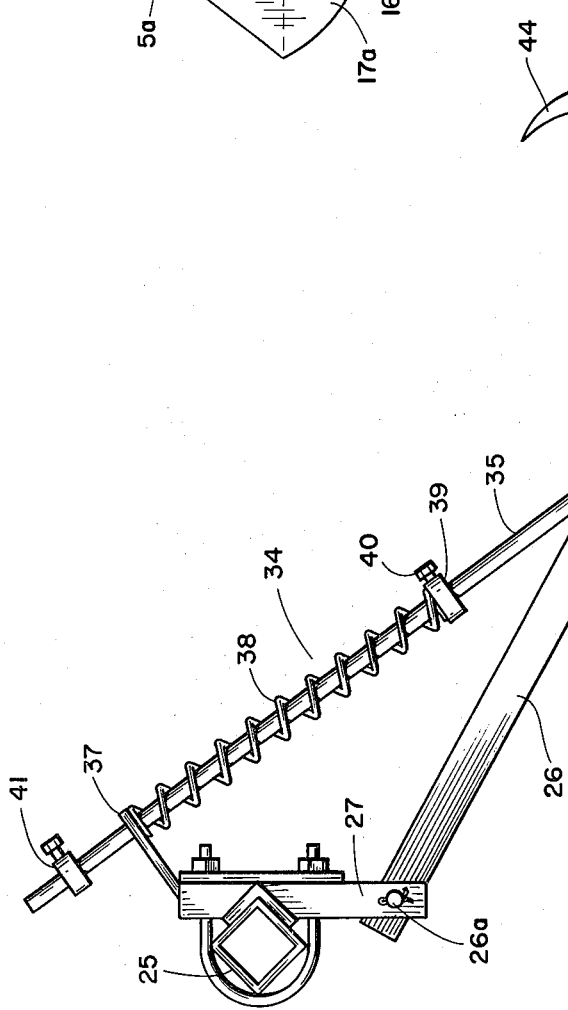

CULTIVATOR SKIMMER DEVICE

BACKGROUND OF THE INVENTION

This invention pertains to cultivator skimmer devices and in particular to a cultivator skimmer which can also be used for skimming off excess soil from germinating seeds or emerging plants while nonetheless preventing the recovering thereof by soil thrown rearward during a cultivation process.

During the period of the year after new crops have been planted, the coming of rain can detrimentally affect the standability of the crop because of several conditions which may result:

A. The rain causes a hard earthen crust to form over the plants prior to their coming up.

B. A hard rain or hail can sometimes cover up the plants with a crust of soil just as they are trying to emerge. When this happens, the plants will die unless they are uncovered.

C. Some types of soil naturally form a hard crust, especially where compaction wheels are used in the planting of seeds during certain moisture conditions.

D. Following a rain and when the individual plants are up in the row but are small, blowing sand can present a serious problem. Rain settles the soil in such a manner that loose sand is left on top whereas the binding materials, such as clays, settle downward. The loose unaggregated particles of sand which remain at the surface are easily blown by the wind and severely damage the small plants unless the field is immediately plowed in order to turn under the sand.

E. Sometimes seeds are planted too deep, or else rains come and wash additional soil over the top of the seeds. In either case the excess soil must be skimmed off to permit emergence of plants from the germinated seed.

To assist in the emergence of plants, to uncover emerged plants which were subsequently recovered with soil, or to prevent blowing of sand, an operation called "scratching" is performed. The main object in "scratching" is to break up and loosen the soil immediately above and around the small plants so that they are not hampered in coming up. In addition, scratching drives many of the sand grains back into the soil and forms crevices into which other grains can fall, so that in either case the sand grains are prevented from blowing against the plants.

A rotary hoe is commonly used for "scratching," and consists of two or more freely rolling wheels having a multiplicity of spikes or rod-like projections which extend outwardly from the rim of the wheels. The rotary hoe is pulled over the area where a crop is in need of scratching, uncovering, or plowing to prevent sand damage, etc.

However, the flow of soil from a rotary hoe during use is such as would be seen from a tire or wheel turning in mud. The soil is picked up and flung out to the rear in a tangent angle from the outer soil-engaging spikes. As a consequence, the plants, and crevices created by the hoe, can be recovered by this rearward casting of erupted soil, thus at least partially defeating the objects of the cultivating operation.

Similar problems are encountered when attempting to skim off soil which lies on top of seeds from which plants are sprouting. If "skimming" is done with a conventional shovel or sweep drawn behind a cultivator, there can be a tendency for some of the erupted soil to fall directly behind the shovel or sweep, thus recovering the sprouting seeds with excess soil.

Although there have been previous attempts to design effective shield devices, such have not proven altogether satisfactory when "scratching" or "skimming" to overcome the aforementioned problems.

Therefore, an object of the present invention is to provide a cultivator skimming device which prevents erupted earth from recovering emerging plants when a cultivating device is used during "scratching," uncovering, or plowing to prevent sand damage.

Another object is to provide a cultivator shield device which can be used with a rotary hoe in order to accomplish the previously stated object.

Still another object is to provide a cultivatory shield device for skimming soil off germinatng seeds while preventing redepositing of skimmed soil on top of the seeds.

These and other objects of the present invention will become more apparent from the following description and the accompanying drawings.

SUMMARY OF THE INVENTION

When viewed from directly above the cultivator skimmer device of the present invention is seen to comprise a front shield-plate portion in the shape of a triangle, the vertex of which is at the front tip of the shield, and the sidewardly extending halves of which angle downwardly from the proximity of a median line drawn from the vertex to the base line of the triangle, thus imparting to the front shield-plate portion a transversal cross-section in the shape of an inverted "V."

Also as viewed from above, the present cultivator skimmer comprises a rear shield-plate portion which extends rearwardly from said first portion, is closed at the top, and has sides which extend downwardly to a distance which corresponds to that to which said halves of the triangular front portion extend downwardly, the sides being spaced apart at the lower edges and to each side of the longitudinal axis of the shield, and thus providing a channel between the sides.

To advantage, the cultivator shield can further comprise a vertically projecting plate attached to the triangular front shield-plate portion on the median line thereof and in longitudinal relationship therewith. To additional advantage, the vertically projecting plate can extend in front of the vertex of the triangular front shield-plate portion to a point ahead of the front tip of the shield.

The present cultivator skimmer can be used in combination with a towing arm having clamping means at the forward end for attachment to the tool bar of a cultivator frame. An extension arm can be rigidly attached at one end to the upwardly projecting plate on the shield, and pivotally attached at the other end to the rear end of the towing arm for free up and down movement of the shield as it rides over the ground. Where preferred, a rotary hoe can be attached to the towing and extension arms, the axle of which is also the connecting pin of the pivotal attachment between the two arms.

BRIEF DESCRIPTION OF THE DRAWINGS

FIG. 4 is a top view of another embodiment of the cultivator skimmer device of the present invention.

FIG. 5 is a top view of still another embodiment of the cultivator skimmer device of the present invention.

FIG. 6 is a side view of cultivator apparatus including the shield skimmer of FIGS. 1–3 and an extension arm of a towing arm to which a series of rotary hoes is also attached.

DESCRIPTION OF PREFERRED EMBODIMENTS

Various embodiments of the present invention will now be described with reference to the drawings, and it will be understood that certain terms used in the description and claims, although easily visualized from the drawings, nonetheless require use of the imagination when actually viewing a cultivator skimmer, e.g., "front shield-plate portion," "rear shield-plate portion," "triangle," "vertex," "base line," "medium line," etc. Nonetheless, it will also be understood that the imaginary visualization of these parts and geometric reference points and lines can be easily accomplished by one skilled in the art who has become familiar with the details of the present disclosure.

Figure 1:
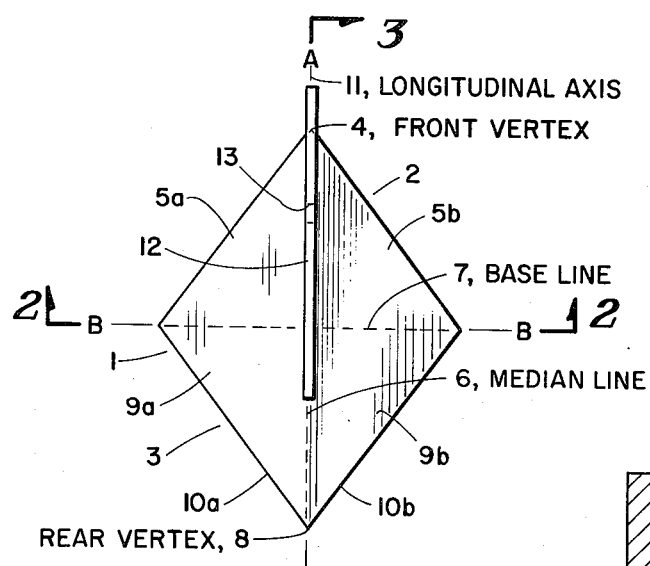
FIG. 1 is a top view of one embodiment of the cultivator skimmer device of the present invention.
Figure 2:
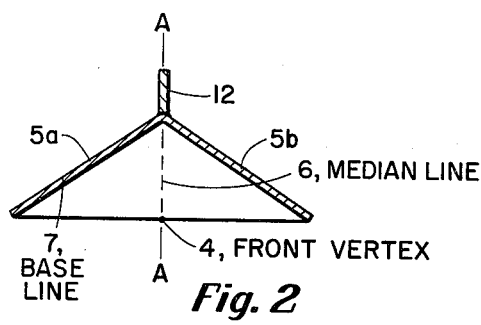
FIG. 2 is a rear sectional view of the device of FIG. 1 when viewed along the line B—B.
Figure 3:
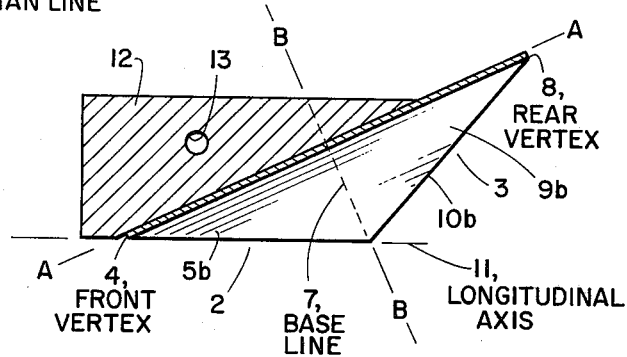
FIG. 3 is a side sectional view of the device of FIG. 1 when viewed along the line A—A.

One advantageous embodiment of the cultivator skimmer device of the present invention is shown in FIGS. 1–3. As presented therein, the skimmer is generally represented at 1, and has a front portion made of steel plate, hereinafter referred to as the front shield-plate portion, and generally represented at 2. There is also a rear shield-plate portion, also made of steel, this being generally represented at 3. The front and rear shield-plate portions are demarked by line B—B. As can be seen from FIG. 1, which is a downward view from directly overhead, the front portion 2 of the shield has the shape of a triangle, and the vertex 4 of which is at the front tip of the shield. The sidewardly extending halves, or sides, 5a and 5b of the triangle slope downwardly from the proximity of the median line 6 drawn from the vertex 4 of the base line 7 of the triangle. Referring to FIG.-2, this downward angling of the sidewardly extendiing halves 5a and 5b imparts a transverse cross-section in the shape of an inverted "V" to the front shield-plate portion 2.

As can also be seen from FIG.-1, the skimmer device 1 has the shape of a parallelogram when viewed from above, so that the rear shield-plate portion 3 has the shape of a second triangle which corresponds to the frist triangle of the front shield-plate portion. The vertex 8 of this second triangle is at the rear tip of the shield 1, and the base line 7 thereof is the same as that of the triangle of the first plate portion 2. In addition, the sidewardly extending halves, or sides, 9a and 9b of the second triangle slope downwardly from median line 6, which in the case of the rear portion 3, extends from the vertex 8 to base line 7. It can be seen from FIGS. 2 and 3 that the downward angle and extension of the sides 9a and 9b of the rear plate portion correspond to that of the sides of the triangle 5a and 5b of the front plate portion, so that the rear plate has a transverse cross-section in the shape of an inverted "V" which matches that of the transverse cross-section of the front portion 2. It can be noted further from FIGS. 1–3 that the rear plate portion 3 extends rearwardly from the first plate portion 2 and that the halves or sides 9a and 9b are spaced apart at their lower edges 10a and 10b and to each side of the longitudinal axis 11 of the shield, thus providing a channel between the sides for the straddling of plants during cultivation.

Vertically projecting plate 12 is attached to the triangular front shield-plate portions 2 on median line 6 and in a longitudinally axial relationship therewith. In preferred embodiments, the vertically projecting plate 12 extends in front of vertex 4 to a point ahead of the front tip of the shield 1. Plate 12 is provided with a hole 13 whereby the shield 1 can be mounted with a nut and bolt to an arm which is clamped to a tool bar on the frame of a cultivator apparatus for the purpose of towing the shield.

FIGS. 4 and 5 represent embodiments of the present invention wherein the rear shield-plate portion has a different configuration from the device shown in FIGS. 1–3. In accordance with FIG. 4, the shield is the same as in FIGS. 1–3 except that the rear shield-plate portion, represented at 14 has the shape of a semicircle with a diameter line 15 which is also the base line of the triangle of said front shield-plate portion 2. The arcuate rear edge 16 of the rear shield-plate portion 14 is the rear edge of the shield, and the two halves 17a and 17b of the semicircular plate are the sides of the rear plate portion of the shield. As can be seen from FIG. 4, these sides extend downwardly as far as the halves, or sides, of the triangular front plate portion, and are spaced apart and to either side of the longitudinal axis 11 of the skimmer 1 to provide a channel between the sides. The channel between sides 17a and 17b can either have the shape of an inverted "V," or can diverge from an inverted "V" at diameter line 15 to an inverted "U" at the rear edge 16.

In FIG. 5, the cultivator skimmer has a front shield-plate portion 18 with a transverse cross-section which diverges rearwardly from an inverted "V" at the vertex 24 to an inverted truncated "V" at the base line 19 of the front plate portion triangle. The rear shield-plate portion, generally represented at 20, has a rearwardly extending top 21 which joins the front shield-plate portion at the center of the base line 19. The sides 22a and 22b of the rear plate portion are triangular in FIG. 5, and the outward corners of these triangles extend to those of the triangular sides 23a and 23b of the front plate portion 18. However, the sides 22a and 22b could be squares, rectangles, circle segments, etc., instead of triangles and these sides could angle more directly downward than sides 23a and 23b, e.g., straight down, to provide a channel beneath the rear plate portion in the shape of an inverted "U."

Figure 7:
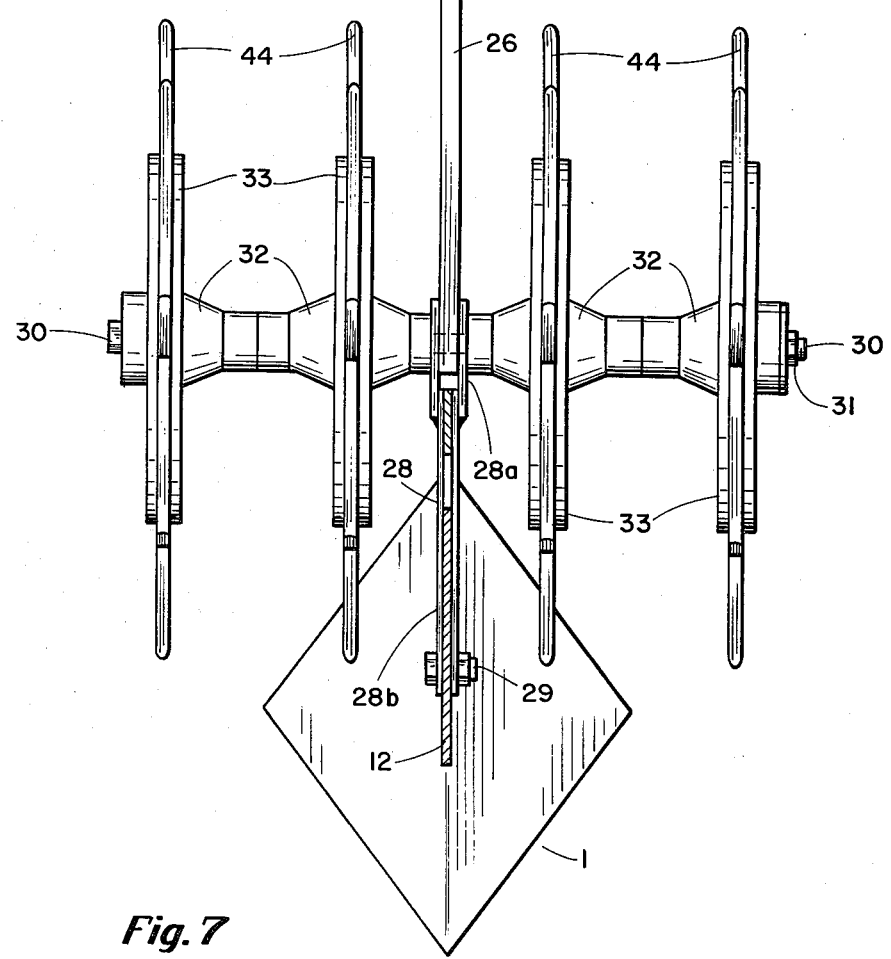
FIG. 7 is a fragmentary top view of FIG. 6 and shows the relation of the cultivator skimmer to the rotary hoes.

FIGS. 6 and 7 illustrate a combination of the cultivator skimmer device of FIGS. 1–3 with apparatus for towing the skimmer when skimming or cultivating crops with a rotary hoe.

In FIG. 6, a tool bar on the frame of a conventional cultivator apparatus is represented at 25. A rigid towing arm 26 is pivotally attached at 26a to the tool bar by means of a clamp 27. The shield device 1, having the upwardly projecting plate 12, is attached to an extension arm 28 by means of nut and bolt 29, the bolt extending through hole 13 of the plate 12. As can be seen from FIG. 7, the extension arm 28 has upper and lower yoke portions, represented at 28a and 28b, respectively. The lower yoke 28b receives the plate 12, and by tightening the nut and bolt 29, the shield 1 is thus rigidly held at a chosen angle with respect to extension arm 28. The upper yoke 28a of the extension arm fits over the rear end of arm 26, and the two arms are held together by means of a nut and bolt which pass through matching drilled holes in the yoke and arm.

Referring further to FIGS. 6 and 7, the arms 26 and 28 are pivotally attached by means of a wheel attaching bolt 30 which is threaded at one end to receive bolt 31. In the illustrated case, the hubs 32 of rotary hoes 33 are mounted on the bolt 30, two on each side of arms 26 and 28. Nut 31 is tightened on the bolt to secure the rotary hoes thereon, but not so tight as to impede turning of the hoes or the free up and down pivoting of arm 28 when the shield is towed over the ground.

The rotary hoe-shield assembly of FIG. 6 is fitted with a shock absorber, generally represented at 34, which prevents excessive vertical "hopping" or bouncing of the ganged hoes during the towing thereof. Rod 35 is pivotally attached at 36 to tow bar 26 and passes through an upper spindle and spring stop 37. A coiled spring 38 is mounted on rod 35 and is maintained under compression by means of the fixed, upper stop 37 and an adjustable lower spring stop 39. Accordingly, compression on the spring 38 can be varied by sliding spring stop 39 up or down on rod 35, followed by securing the stop in place with lock bolt 40. Rod 35 is also provided with a rod-stop 41 which limits the degree of downward rotation of arm 26 at pivot point 26a when the rotary hoe-shield assembly is raised from the ground by means of the tool bar 25.

As previously indicated, the cultivator-skimmer device of the present invention can be used with or without additional cultivator tools such as rotary hoes. FIGS. 6 and 7 illustrate a "scratching" operation wherein rotary hoes and the present shielding device are being used to disrupt a crusty top layer of soil 42 so that impeded plants 43 can emerge into the air and thus see the sun. Accordingly, rotary hoes and the attached shield are towed behind a cultivator so that the two arms 26 and 28 and skimmer 1 are longitudinally aligned over the row of impeded plants to be relieved. Crusted soil near each side of the plants is broken up by the tines 44 of the rotary hoes, and although a considerable part of this erupted soil is thrown rearwardly, it does not fall upon the plants being relieved, but is instead deflected to either side by the sloped sides of the shield 1 while the young plants 43 are straddled within the inverted V-shaped channel beneath front and rear plate portions of the shield.

It should also be noted from the drawings that the forward tip of the shield is aligned on the longitudinal axis of the tow arm 26 so that the tip passes directly over the rowed plants being relieved and hence in contact with a portion of the crusted soil which is not contacted by the tines of the rotary hoes. Advantageously, the front tip of the shield cuts into this crust along the center line of the now being cultivated, thus accomplishing a more efficient and useful disruption of the plants than if rotary hoes alone were used. In addition, there is also advantage to extension of the vertical plate 12 ahead of the vertex 4 to a point in front of the shield, for in such a case the plate functions as a splitter bar which actually breaks and parts the earth prior to its being further separated and guided away from the small plants by the sides of the shield.

As was previously indicated, the present cultivator shield device can be used in "skimming" operations wherein rotary hoes, shovels, sweeps, etc., are dispensed with, and skimming action of the shield itself is relied on to remove excess soil from plants which are sprouting from seeds or attempting to break through the surface. Accordingly, the shield functions as just described in parting the soil and pushing it aside so that it is not redeposited at the site from which it has just been removed. This type of skimming operation can be used to advantage, for example, when seeds have been planted in a furrow rather than on top of a row, and rains have caused excess earth to wash over the seeds. In any event, however, the shield device of the present invention can be used to skim off excess soil which would interfere with germination of seed and/or emergence of sprouting plants.

It will be understood that the depth to which the skimmer skims soil, as a result of its own plowing effect, is a function of the upward or downward pitch angle at which vertex 4 of the shield is set; and, as was previously indicated, this is adjustable by loosening nut and bolt 29, followed by retightening of the same after the pitch angle of the shield has been reset.

The width of the present shield is subject to variation and depends to a large extent on the distance to which dirt should be swept aside from emerging plants or covered seed, while also taking into account any minor deviation of the shield from the intended course of travel as the cultivator is driven over the row. As can be seen from FIG. 7, it is advantageous that the shield have a width almost at least as great as the span across a gang of rotary hoes being used to work a row of plants. Similarly, the downward angle of the sides of the shield is subject to variation, the purpose of the angling being, inter alia, to let the shield straddle the plants and deflect aside the erupted soil. Included angles within the range of about 75° to about 150° have proven satisfactory whereas included angles of about 90° to about 120° have shown the most satisfactory results. In any event, the preferred width, pitch angle, transverse cross-section angle, etc., of the shield are factors which can be determined through simple experimentation while following the teaching of this disclosure as a guideline.

The apparatus of the present invention has been successfully employed on many varieites of row crops, e.g., corn, grain, sorghum, cotton, and soy beans. It has been used with particular success in preventing "big shank" when growing cotton. Using the presently disclosed skimmer device, the plants spring up beneath the shield and can actually be seen shining down the row after the cultivator has passed over them.

While the present invention has been described with reference to particular embodiments, configurations, arrangements of apparatus, and materials of construction, it will nontheless be understood that even other embodiments will become apparent which are within the spirit and scope of the invention defined in the following claims.

What we claim and desire to secure by Letters Patent is:

1. A cultivator skimmer which when viewed from directly overhead comprises:
   a. a front shield-plate portion in the shape of a triangle, the vertex of which is at the front tip of the shield and the sidewardly extending halves of which angle downwardly from the proximity of a median line drawn from said vertex to the base line of said triangle, thus imparting to the front shield-plate portion a transverse cross-section in the shape of an inverted "V," and b. a rear shield-plate portion which extends rearwardly from said first portion, said rear portion being closed at the top and having sides which extend downwardly to a distance which corresponds to that to which said halves of the triangular front portion extend downwardly, said sides being spaced apart at their lower edges and to each side of the longitudinal axis of the shield, and thus providing a channel between the sides.

2. A cultivator skimmer as in claim 1 and further comprising a vertically projecting plate which is attached to the triangular front shield-plate portion on said median line and in longitudinal relationship with the median line.

3. A cultivator skimmer as in claim 2 wherein said vertically projecting plate extends in front of said vertex to a point ahead of the front tip of the shield.

4. Apparatus as in claim 2 and further comprising a towing arm having a clamping means at the forward end for attachment to the tool bar of a cultivator frame, an extension arm which is rigidly attached at one end to the upwardly projecting plate on the shield and which is pivotally attached at the other end to the rear end of the towing arm for free up and down movement of the shield when it is towed.

5. Apparatus as in claim 4 wherein the extension arm is rigidly attached to said plate with a threaded bolt and nut, said bolt passing slidably through a hole in the plate, and whereby the pitch angle of the shield is changed by loosening the bolt and nut, pivoting the shield to a desired angle, and retightening the bolt and nut.

6. Apparatus as in claim 5 and further comprising a rotary hoe having an axle which is also the connecting pin of the pivotal attachment between the towing arm of the extension arm.

7. A cultivator skimmer as in claim 1 which when viewed from directly overhead has the shape of a parallelogram and wherein the rear shield-plate portion has the shape of a second triangle which corresponds to said triangle of the first shield-plate portion, the vertex of said second triangle being at the rear tip of the shield, the base line thereof being the same as that of the triangle of said first shield-plate portion, and the sidewardly extending halves of which angle downwardly from a median line extending from the vertex to the base line of the second triangle, the downward angle of said halves of the rear shield-plate portion corresponding to that of said halves of the front shield-plate portion, thus imparting to said rear shield-plate portion a cross-section having the shape of an inverted "V."

8. A cultivator skimmer as in claim 1 which when viewed from directly overhead has a rear shield-plate portion in the shape of a semi-circle with a diameter line which is the same as the base line of the triangle of said front shield-plate portion, the rear shield-plate portion having an arcuate edge which is also the rear edge of the shield.

9. A cultivator skimmer as in claim 1 which when viewed from directly overhead has a front shield-plate portion with a transverse cross-section which diverges rearwardly from an inverted V-shape at said vertex to an inverted truncated V-shape at the base line of said triangle, and wherein the rear shield-plate portion has a rearwardly extending top which joins the front shield-plate portion at the center of said base line.

10. A cultivator skimmer as in claim 9 wherein the front edges of the sides of the rear shield-plate portion are joined to the front shield-plate on either side of said top at said base line.

* * * * *